US008473295B2

(12) United States Patent
Mowatt et al.

(10) Patent No.: US 8,473,295 B2
(45) Date of Patent: Jun. 25, 2013

(54) REDICTATION OF MISRECOGNIZED WORDS USING A LIST OF ALTERNATIVES

(75) Inventors: David Mowatt, Seattle, WA (US); Robert E. Dewar, Bellevue, WA (US); Robert L. Chambers, Sammamish, WA (US); Felix Gerard Torquil Ifor Andrew, Seattle, WA (US); Oliver Scholz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1442 days.

(21) Appl. No.: 11/255,329

(22) Filed: Oct. 21, 2005

(65) Prior Publication Data

US 2007/0033037 A1 Feb. 8, 2007

Related U.S. Application Data

(60) Provisional application No. 60/705,835, filed on Aug. 5, 2005.

(51) Int. Cl.
*G10L 15/04* (2006.01)
*G10L 15/02* (2006.01)

(52) U.S. Cl.
USPC ............................ 704/251; 704/231; 704/235

(58) Field of Classification Search
USPC .................. 704/251, 257, 239, 231–236
See application file for complete search history.

(56) References Cited

U.S. PATENT DOCUMENTS

| | | | | |
|---|---|---|---|---|
| 5,428,707 A * | 6/1995 | Gould et al. | ................. | 704/231 |
| 5,608,622 A * | 3/1997 | Church | ............................. | 704/3 |
| 5,640,485 A * | 6/1997 | Ranta | ............................. | 704/251 |
| 5,799,279 A * | 8/1998 | Gould et al. | ................... | 704/275 |
| 6,278,968 B1 * | 8/2001 | Franz et al. | ....................... | 704/3 |
| 6,363,347 B1 * | 3/2002 | Rozak | ........................... | 704/244 |
| 6,418,410 B1 * | 7/2002 | Nassiff et al. | ................ | 704/251 |
| 6,513,005 B1 * | 1/2003 | Qin et al. | ....................... | 704/254 |
| 7,280,964 B2 * | 10/2007 | Wilson et al. | ................. | 704/251 |
| 7,315,818 B2 * | 1/2008 | Stevens et al. | ................ | 704/235 |
| 2002/0138261 A1 * | 9/2002 | Ziegelmiller | ................. | 704/231 |
| 2002/0138265 A1 | 9/2002 | Stevens et al. | | |
| 2003/0115066 A1 * | 6/2003 | Seeley et al. | ............... | 704/270.1 |
| 2005/0043949 A1 * | 2/2005 | Roth et al. | ..................... | 704/251 |
| 2006/0293889 A1 * | 12/2006 | Kiss et al. | ..................... | 704/235 |
| 2008/0201140 A1 * | 8/2008 | Wells et al. | .................... | 704/231 |

FOREIGN PATENT DOCUMENTS

| | | |
|---|---|---|
| CN | 1183606 | 6/1998 |
| CN | 1282072 | 1/2001 |

OTHER PUBLICATIONS

Written Opinion and Search Report for corresponding PCT application PCT/US2006/030812 dated Feb. 14, 2008.
Office Action from corresponding Chinese application 200680028638.X, dated Aug. 26, 2011.
Notice of First Office Action for corresponding application No. 200680028638.X dated May 12, 2010.
Notice of Second Office Action from corresponding Chinese application 200680028638.X, dated Jan. 19, 2011.

* cited by examiner

*Primary Examiner* — Pierre-Louis Desir
*Assistant Examiner* — Abdelali Serrou
(74) *Attorney, Agent, or Firm* — Westman, Champlin & Kelly, P.A.; Theodore M. Magee

(57) ABSTRACT

Upon selection of a displayed word, a list of alternatives for the selected word is displayed. Each alternative in the list has an associated symbol. A speech signal is then decoded to identify a list of possible words and the list of possible words is displayed with each possible word having an associated symbol.

9 Claims, 7 Drawing Sheets

I was in ore of him.|

I was in |ore| of him.

Say the number that is
next to the item you want 1. or
2. Or
3. all
4. aw
5. uh

Don't see the text you want?
Say the word again,
Or, say "I'll spell it again"

I was in |ore| of him.

Say the number that is
next to the item you want 1. uh
2. Uh
3. awe
4. all
5. oh Don't see the text you want?
Say the word again,
Or, say "I'll spell it again"

FIG. 8   800
802

I was in awe of him.|

FIG. 9

REDICTATION OF MISRECOGNIZED WORDS USING A LIST OF ALTERNATIVES

REFERENCE TO RELATED APPLICATION

This application claims priority benefit of U.S. Provisional application 60/705,835, filed on Aug. 5, 2005 and entitled REDICTATION OF MISRECOGNIZED WORDS USING A LIST OF ALTERNATIVES.

BACKGROUND

Speech recognition is the conversion of speech signals into words. During speech recognition, the speech signals are compared to one or more models to identify the words that may have been spoken.

In general, speech recognition is a probabilistic technique that attempts to identify a sequence of phonetic units that provides the highest probability for the speech signal. Many recognition systems not only identify the most likely sequence of words, but also identify less likely yet possible alternative sequences of words that may be represented by the speech signal.

Even the best speech recognition systems occasionally recognize the wrong word. Currently, applications that rely on speech recognition provide ways in which users can correct these errors. For example, one simple technique has the user select the word that is in error using an input device and then type in the correct word.

Another error correction technique has the user select the word using a speech command. The application then provides a list of alternative words that were returned by the speech recognition engine as being likely alternatives to the most likely word that was recognized. In one such system, each alternative word is associated with a number such that the user can select the word by speaking the number.

In order for such a correction scheme to work, the word that the user wanted must appear in the list of alternatives. If the recognition system does not produce the wanted word as an alternative this correction scheme could not be used to make the correction.

Another way for a user to correct words is to select the word that is in error and then simply redictate the word they wanted. This correction process works well if the speech recognition system is able to recognize the word when it is pronounced again. However, many times the speech recognition engine will misidentify the word again and replace the selected word with another word that is wrong. This will require further redictation by the user and can frustrate users.

The discussion above is merely provided for general background information and is not intended to be used as an aid in determining the scope of the claimed subject matter.

SUMMARY

Upon selection of a displayed word, a list of alternatives for the selected word is displayed. Each alternative in the list has an associated symbol. A speech signal is then decoded to identify a list of possible words and the list of possible words is displayed with each possible word having an associated symbol.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter

BRIEF DESCRIPTION OF THE DRAWINGS

FIG. 7 is an image of displayed text with a second correction dialog box.
FIG. 8 is a display of recognized text with a third dialog box.
FIG. 9 is a display with corrected text.

DETAILED DESCRIPTION

Figure 1:
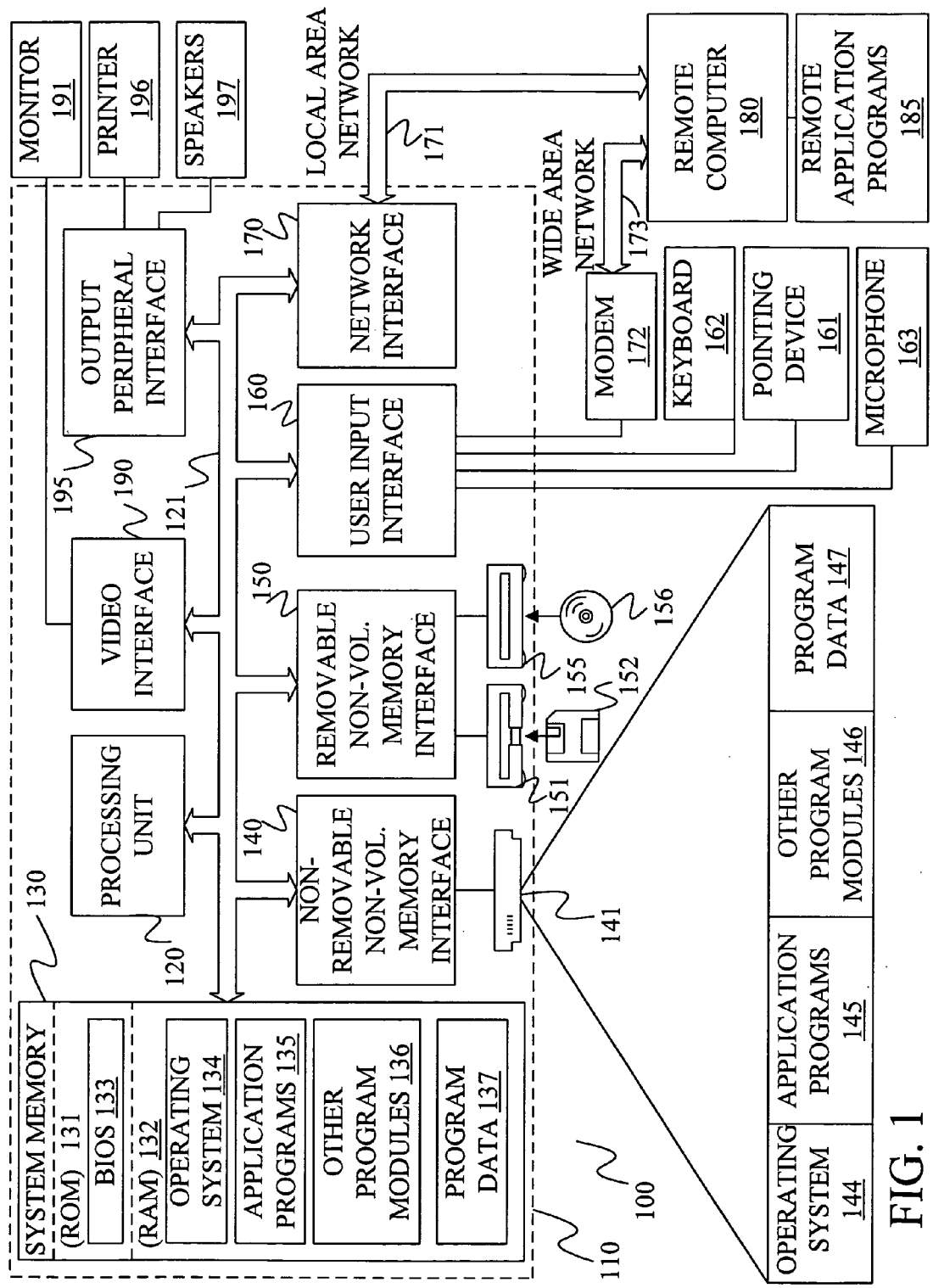
FIG. 1 is a block diagram of a computing environment.

FIG. 1 illustrates an example of a suitable computing system environment 100 on which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
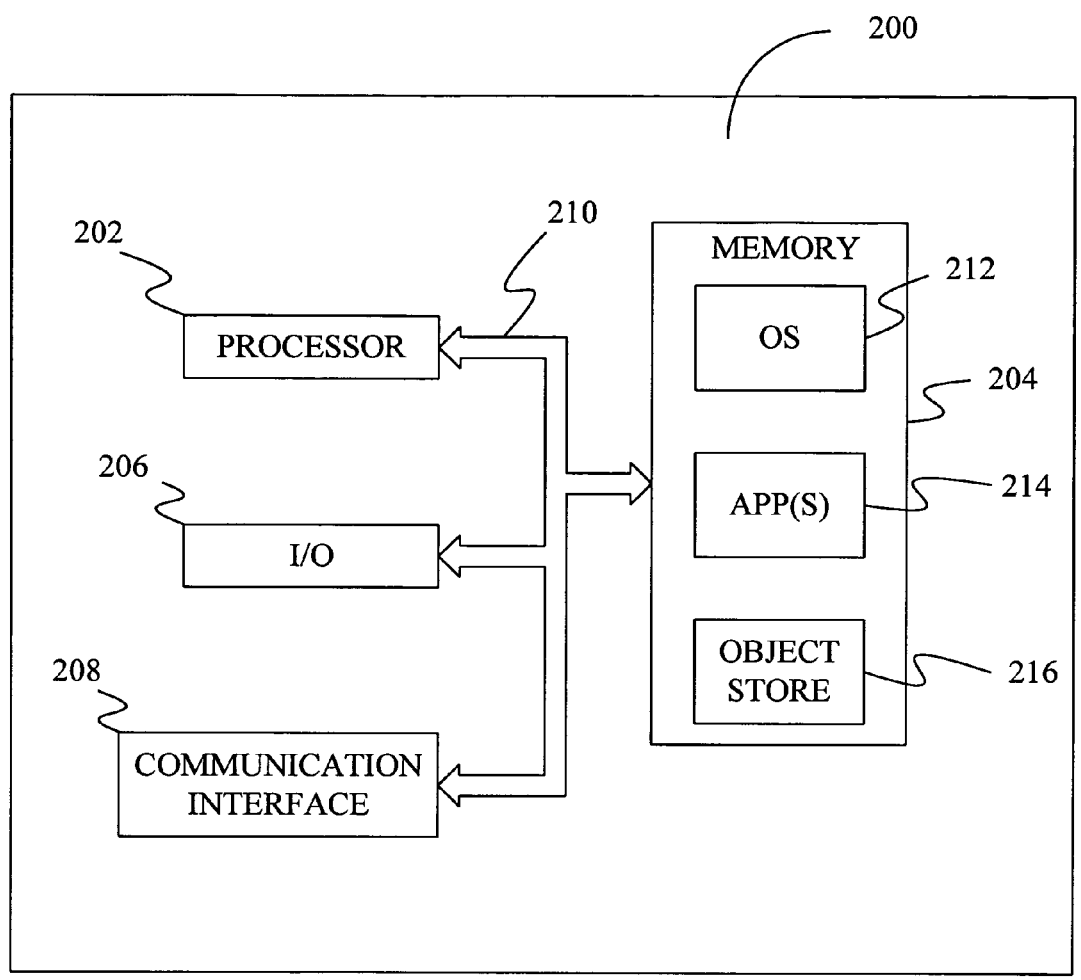
FIG. 2 is a block diagram of a mobile computing environment.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Figure 3:
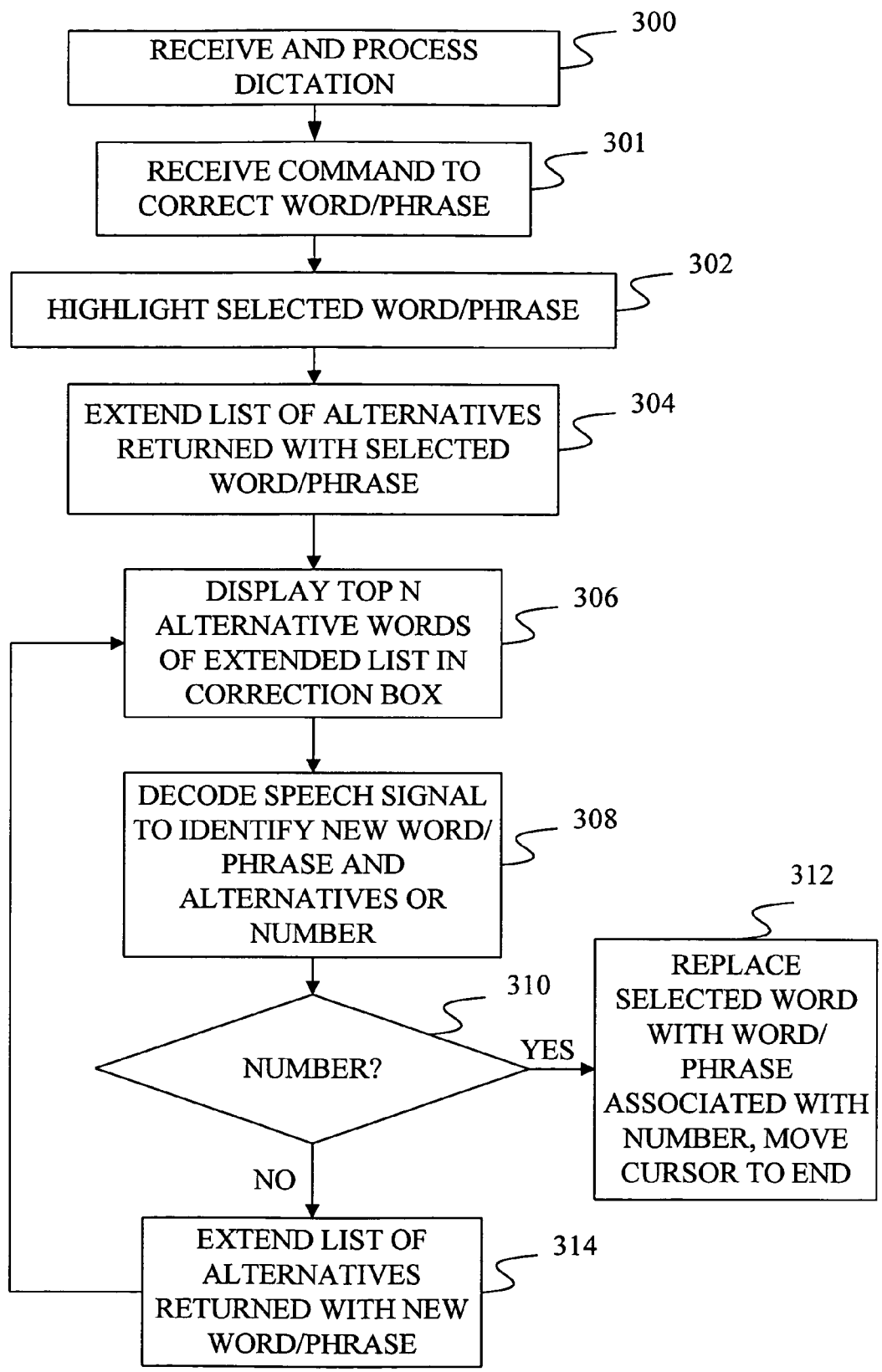
FIG. 3 is a flow diagram of a method for redictation using lists of alternatives.
Figure 4:
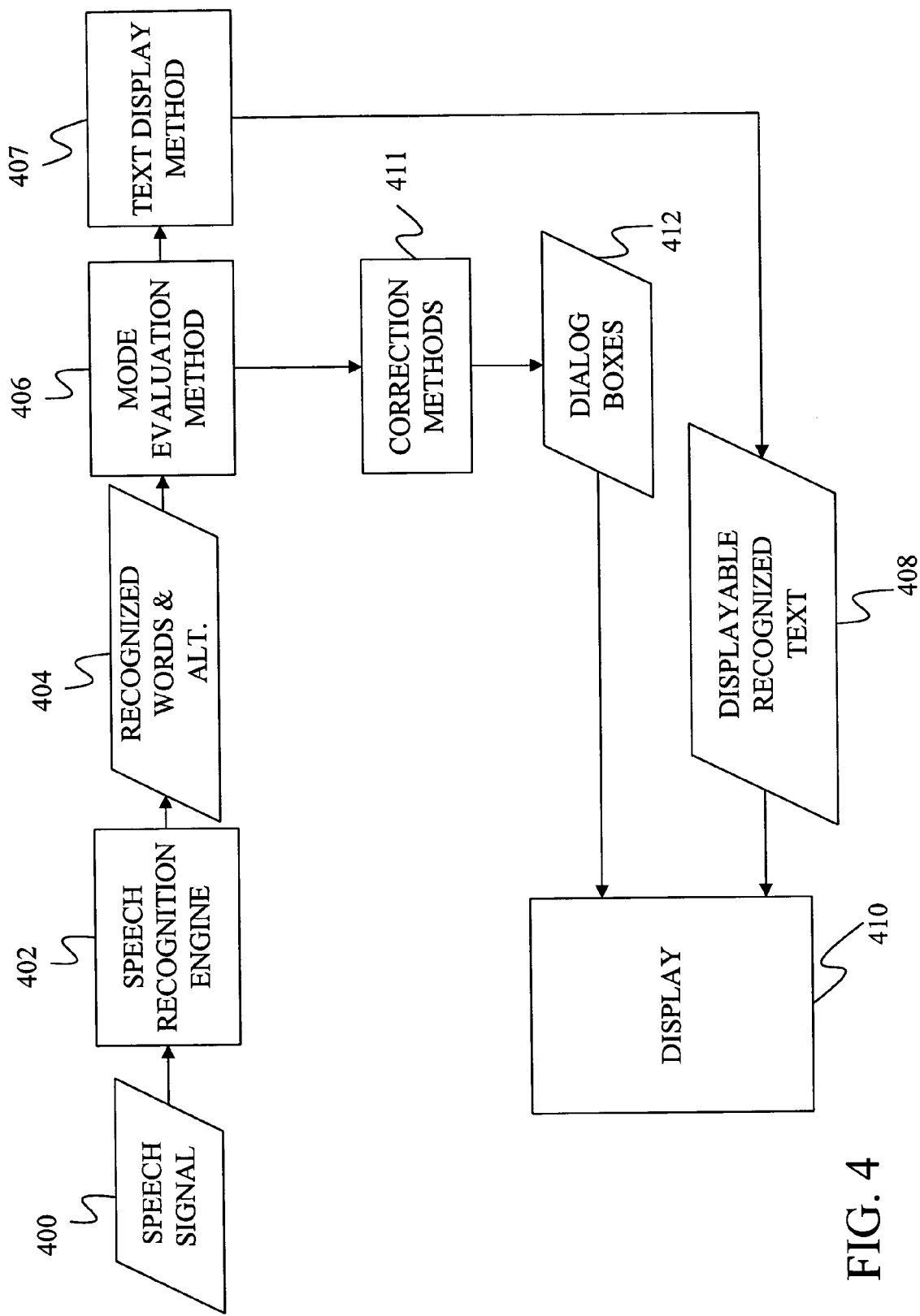
FIG. 4 is a block diagram of elements used in the flow diagram of FIG. 3.

The present invention provides new techniques for invoking and selecting lists of alternatives. FIG. 3 provides a flow diagram of one embodiment for invoking and using lists of alternatives for correcting speech recognition errors. FIG. 4 provides a block diagram of elements used in the method of FIG. 3.

In step 300 of FIG. 3, a speech signal 400 of FIG. 4 is provided to a speech recognition engine 402, which produces recognized words and alternatives 404. Under one embodiment, each word recognized by speech recognition engine 402 is provided with one or more alternatives that are less likely than the recognized word but still plausible given the speech recognition models.

Recognized words and alternatives 404 are provided to a mode evaluation method 406, which determines whether the spoken utterance represents dictation or a command. If mode evaluation method 406 determines that the recognized words represent dictation, mode evaluation method 406 calls text display method 407, which generates displayable recognized text 408, which is displayed on display 410.

Figures 5, 6:
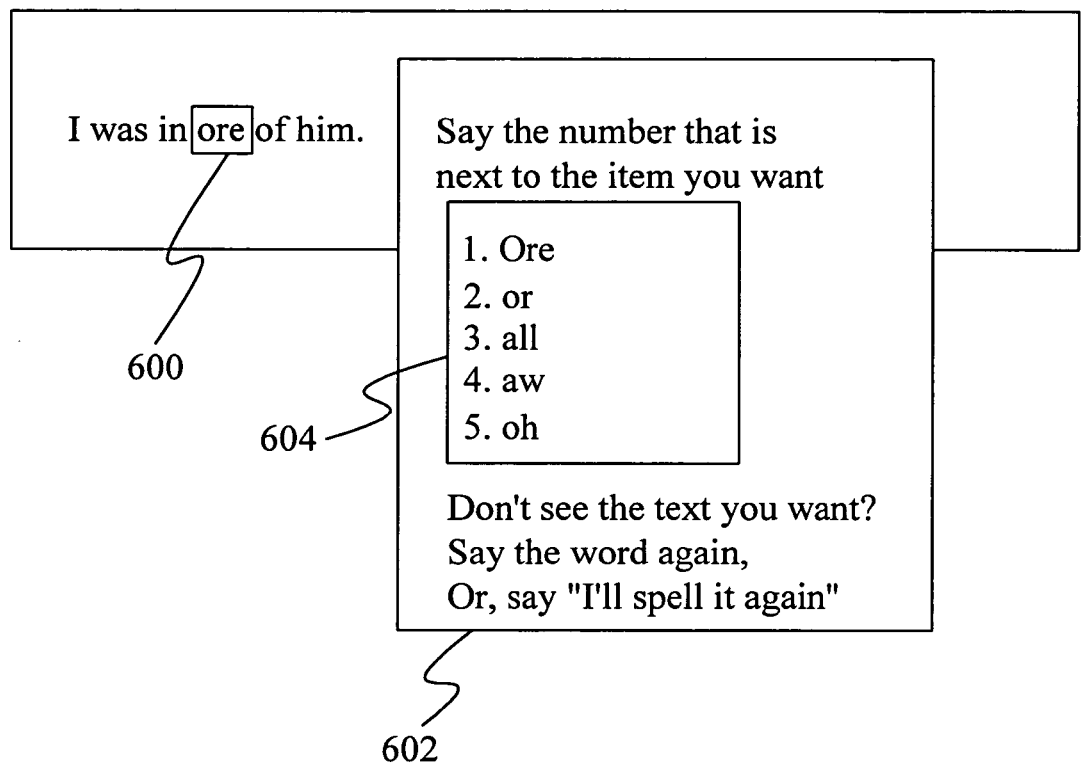
FIG. 5 is an image of a display with recognized text.
FIG. 6 is the display of FIG. 5 with a correction dialog box.

FIG. 5 provides an example of displayed recognized text that includes an error. In particular, in the example of FIG. 5, the user spoke the phrase "I was in awe of him" but the speech recognition engine recognized it as "I was in ore of him."

At step 301, the user issues a command to correct a word or phrase in the displayed dictation. Under one embodiment, this command is a vocal command such as "correct ore", which is decoded by speech recognition engine 402 to produce recognized words and alternatives 404. The recognized words and alternatives are evaluated by mode evaluation method 406 to determine if they contain a command. Since the recognized words contain a command to correct text, mode evaluation method 406 calls correction method 411, which highlights the selected word or phrase at step 302 as shown by highlighting box 600 of FIG. 6.

In some embodiments, at step 304, correction method 411 extends the list of alternatives that were returned with the selected word or phrase in the original dictation. Specifically, starting with the most likely word in the list of alternatives, correction method 411 adds alternative representations of the word such as capitalizing the first letter of the word, converting textual versions of words into symbols such as converting "one" to "1", and adding abbreviations for words such as "st." for "street".

At step 306, correction method 411 displays the top n alternative words from the extended list in a correction dialog box 412. The dialog box 412 is then displayed on display 410.

FIG. 6 provides an example of a dialog box 602, which provides a list 604 of the top n words in the extended list of alternative words. In the example of FIG. 6, five alternatives have been provided. In other embodiments, eight alternatives are provided. Those skilled in the art will recognize that any number of alternatives may be provided to the user.

In list 604, each alternative word has been associated with a symbol, specifically a number. In the dialog box, the user is instructed to say the number that is next to the item that they want. Thus, if the extended list of alternatives includes the alternative that the user wants, the user may simply speak the number to select the word. Dialog box 602 also instructs the user to say the word again if they do not see the word in list 604.

At step 308, the user either says a number for an item in the list or re-pronounces the word. Speech recognition engine 402 decodes the user's speech to produce a new set of recognized words and alternatives 404, which is provided to text evaluation method 406. At step 310, text evaluation method 406 determines if the decoded words refer to a number. If the decoded word is a number, the selected word, such as word 600, is replaced by the word or phrase associated with the number in the list of alternatives. The cursor is then moved back to the place at which it was located when the correction command was issued.

If the decoded speech signal does not refer to a number at step 310, the lists of alternatives provided with the newly decoded word or phrase in step 308 is extended at step 314 by adding alternative representations of the words in the list. The process then returns to step 306 to display the top n alternative words of the new extended list in a correction dialog box.

An example of such a dialog box is shown in FIG. 7 as dialog box 700. In dialog box 700, list 702 is shown to contain a different collection of word alternatives. The list of alternatives has changed because the user's pronunciation of the word during redictation was slightly different than it was during the original dictation.

As shown in FIG. 7, the user is once again given the opportunity to either state a number or repronounce the word. If the user repronounces the word, the word is decoded and a new set of alternatives are identified at step 308 based on that new pronunciation. At step 310, text evaluation method 406 determines if the user has stated a number. If the user once again does not state a number, the new alternatives list is extended at step 314 and the process returns to step 306.

Upon returning to step 306 a new dialog box, which is dialog box 800 of FIG. 8, is shown with a new alternative list 802. Steps 306, 308, 310 and 314 are repeated until the user selects a number or otherwise exits the dialog box. If the user selected a number at step 310, such as number 3 in FIG. 8, the text associated with the number would replace the selected text at step 312 producing the display of FIG. 9 in which the word "awe" has been put in place of the word "ore." The cursor is then moved to the point where it was before the correction command was issued.

As described above, the method of FIG. 3 allows the user to continue to obtain a list of alternatives until they find a list that contains the word they want. This improves the chances that the user will be able to indicate which word they actually want to appear in the dictation since the user is always given multiple items to select from with each pronunciation.

Although the method of FIG. 3 was shown with an example involving a single word, those skilled in the art will recognize that an entire phrase could be used in place of one word. In such a case, the user would select more than one word and the alternative list would contain a list of alternative phrases. With each pronunciation of the phrase, a new list of alternative phrases would be produced until the phrase the user wanted appeared.

Figure 10:
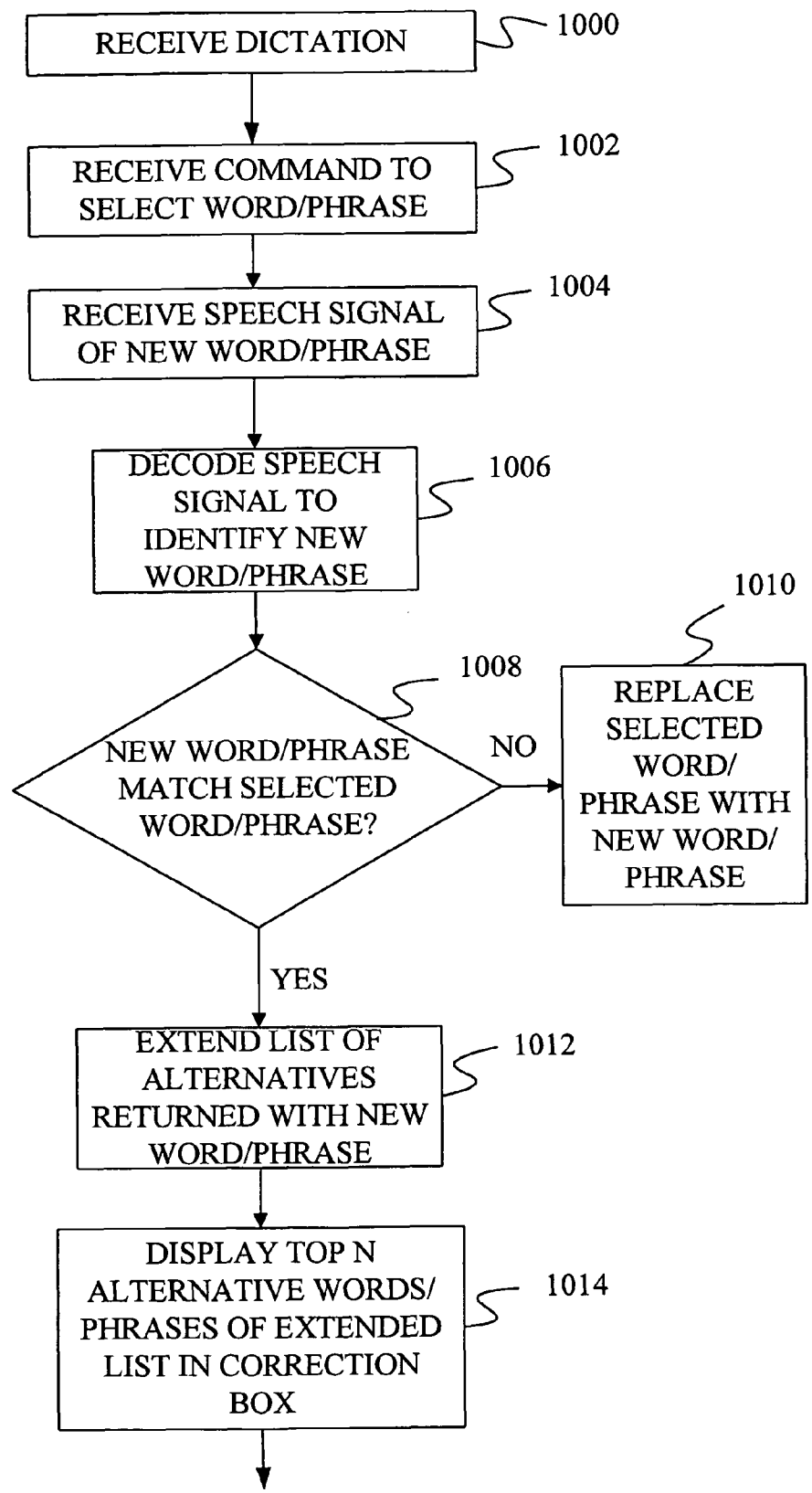
FIG. 10 is an alternative flow diagram for invoking lists of alternatives.

FIG. 10 provides an alternative method for invoking lists of alternatives. At step 1000, dictation is received from the user and is decoded into text that is displayed. At step 1002, a command is received to select a word or phrase. At step 1004, a speech signal is received representing a new word or phrase that is to replace the selected phrase. At step 1006, the speech signal is decoded to identify the new word or phrase.

At step 1008, the new word or phrase is compared to the selected word or phrase to determine if they match. For a single word, the new word must match exactly. Under one embodiment, phrases will match if the first word and the last word of the phrases are the same, regardless of whether the other words of the phrase match. If the new word or phrase does not match the selected word or phrase at step 1008, the selected word or phrase is replaced with the new word or phrase at step 1010. If the new word or phrase does match the selected word or phrase at step 1008, the list of alternatives returned with the new word or phrase in decoding step 1006, is extended at step 1012 by finding alternative representations for words in the alternatives list as discussed above. Note that for phrases, the list of alternatives may not be extended so that more the phrases identified by the speech recognition engine may be provided to the user.

At step 1014, the top n alternative words or phrases of the extended list of alternatives is shown in a correction box such as correction box 602 of FIG. 6. The process of FIG. 10 then enters a loop as shown in FIG. 3 by continuing at box 308 of FIG. 3.

In the embodiment of FIG. 10, a list of alternatives is provided to the user upon detecting that the speech recognition engine has made the same mistake at step 1008. This helps the user to obtain a list of alternatives when the speech recognition engine continues to make the same mistake in recognizing the speech without requiring the user to take any action other than repronouncing the word to cause the list of alternatives to appear.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving a command to correct a displayed word in a displayed text;
   highlighting the displayed word to be corrected in the displayed text; displaying a first list of alternatives for the displayed word while continuing to highlight the displayed word to be corrected in the displayed text, each alternative having an associated number;
   receiving a speech signal consisting of a pronunciation of a word that is not in the first list of alternatives and is not a number while displaying the first list of alternatives for the displayed word;
   decoding the speech signal received while displaying the first list of alternatives for the displayed word to produce a decoded word and a second list of alternative words while displaying the first list of alternatives for the displayed word;
   a processor determines that the decoded word is not a number;
   because the decoded word is not a number, displaying the decoded word and the second list of alternative words to the user while continuing to highlight the displayed word to be corrected in the displayed text, the decoded word and each word in the second list of alternative words each displayed word having an associated number;
   receiving a second speech signal; decoding the second speech signal to identify a second decoded word and a third list of alternative words;
   the processor determines that the second decoded word is a number associated with a word in the second list of alternative words, where the word associated with the number was not present in the first list of alternative words; and
   replacing the highlighted word to be corrected in the displayed text with the word associated with the number indicated by the second decoded word.

2. The method of claim 1 further comprising: before receiving the command to correct a word, decoding an initial speech signal to identify the word and at least one word in the list of alternatives.

3. The method of claim 2 further comprising: decoding the initial speech signal to identify a word, determining an alternative representation for the word, and placing the word and the alternative representation for the word in the list of alternatives.

4. The method of claim 1 further comprising: prompting the user to either pronounce a symbol in the list of alternatives or to pronounce a word that is not shown in the list of alternatives.

5. The method of claim 1 further comprising:
   receiving a command to correct a phrase consisting of at least two words;
   displaying a list of alternatives for the phrase, each alternative having an associated number;
   receiving a speech signal;
   decoding the speech signal to identify a decoded word or phrase and a fourth list of alternatives;
   determining if the decoded word or phrase is a number; and
   if the decoded word or phrase is not a number, displaying the decoded word or phrase and the fourth list of alternatives to the user, the decoded word or phrase and each alternative in the fourth list of alternatives being displayed next to an associated number.

6. A hardware computer-readable storage medium having computer-executable instructions for performing steps comprising:
   receiving a command to select a plurality of incorrect words in a text;
   decoding a speech signal to identify a replacement phrase for the plurality of incorrect words and a list of alternative phrases;

comparing only the first word of the replacement phrase to the first word in the plurality of incorrect words and the last word of the replacement phrase to the last word in the plurality of incorrect words;

replacing the plurality of incorrect words with the replacement phrase if either the first word of the replacement phrase is different from the first word of the plurality of incorrect words or the last word of the replacement phrase is different from the last word of the plurality of incorrect words; and displaying at least one phrase from the list of alternative phrases if the first word of the replacement phrase is the same word as the first word of the plurality of incorrect words and the last word of the replacement phrase is the same word as the last word of the plurality of incorrect words regardless of whether other words in the replacement phrase match other words of the plurality of incorrect words.

7. A method comprising:

decoding a speech signal to identifying a word and a list of alternatives;

displaying the word;

receiving an indication that the word has been selected;

highlighting the selected word;

displaying at least one word from the list of alternatives in a first displayed list while highlighting the selected word, each displayed word being displayed next to a respective number;

decoding a second speech signal received while displaying the first displayed list, the second speech signal consisting of a pronunciation of a word that is not in the first displayed list, to decode a second word and a second list of alternatives from the second speech signal while displaying the first displayed list;

determining if the second word is a number;

if the second word is not a number, displaying the second word and at least one word from the second list of alternatives in a second displayed list while highlighting the selected word, the second word and each word in the second list of alternatives being displayed next to a respective number;

receiving a third speech signal;

decoding the third speech signal to identify a third word and a third list of alternatives;

determining that the third word is a number; and replacing the selected word with the word displayed in the second displayed list next to the number indicated by the third word.

8. The method of claim 7 further comprising:

displaying an initial phrase;

receiving an indication that the initial phrase has been selected;

displaying a list of alternative phrases;

decoding a speech signal to identify a second phrase and a second list of alternative phrases; and displaying the second phrase and at least one phrase from the second list of alternative phrases.

9. The method of claim 8 further comprising: receiving an indication that one of the displayed phrases from the second list of alternative phrases has been selected and replacing the initial phrase with the selected phrase from the second list of alternative phrases.

* * * * *